United States Patent Office 3,502,724
Patented Mar. 24, 1970

3,502,724
p-CHLORO-N-(CHLOROPROPYL)-α-METHYL-PHEN-ETHYLAMINES AND THE SALTS THEREOF
Hans Bruderer, Riehen, Switzerland, assignor to Hoffmann-La Roche Inc., Nutley, N.J., a corporation of New Jersey
No Drawing. Filed Nov. 25, 1966, Ser. No. 596,788
Claims priority, application Switzerland, Dec. 15, 1965, 17,309/65
Int. Cl. C07c 87/28; A61k 27/00
U.S. Cl. 260—570.8          5 Claims

ABSTRACT OF THE DISCLOSURE p-Chloro - N - (chloropropyl) - α - methyl - phenethylamines, prepared, inter alia, by halogenating the corresponding p-chloro-N-(hydroxypropyl)-α - methyl - phenethylamine, are described. The end products are useful as appetite inhibitors.

---

The present invention relates to a novel class of therapeutically active compounds and to a process for the manufacture thereof. More particularly, the invention relates to novel phenethylamines having appetite-inhibiting activity.

The compounds of the invention are selected from the group consisting of compounds characterized by the formula

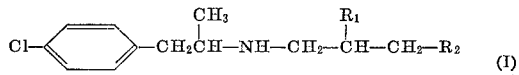

wherein when $R_1$ is hydrogen, $R_2$ is chlorine; and when
$R_1$ is chlorine, $R_2$ is hydrogen, and salts thereof with pharmaceutically acceptable acids, such as, hydrochloric acid, hydrobromic acid or the like. The preferred compound of this invention is p-chloro-N-(3-chloropropyl)-α-methyl-phenethylamine.

The compounds of this invention may be prepared by one of several known processes. A suitable process comprises reacting a compound characterized by the formula

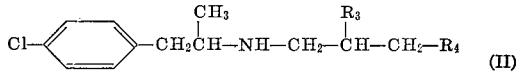

wherein when $R_3$ is hydrogen, $R_4$ is hydroxyl, and when
$R_3$ is hydroxyl, $R_4$ is hydrogen, with a halogenating compound which, in a known manner, will replace the hydroxyl group with a halogen atom such as chlorine. Suitable halogenating agents include thionyl chloride, hydrogen chloride, phosphorus pentachloride, sulfuryl chloride or the like. The reaction is preferably effected in an anhydrous inert solvent; for example, in ether, methylene chloride, chloroform, or the like. The temperature at which the reaction is carried out can vary within wide limits. It can be brought about at a temperature range between room temperature and reflux temperature. When using thionyl chloride, the reaction is conveniently carried out at room temperature. The thionyl chloride is added dropwise with stirring to the solution of the starting material presented by Formula II.

The compounds of Formula II, which are used as starting material in the embodiment described above, are novel substances, and, for example, can be prepared by reacting p-chlorophenyl-acetone and a compound selected from the group consisting of 1-amino-propan-3-ol and 1-amino-propan-2-ol with subsequent hydrogenation of the reaction product to yield the desired compounds, e.g., p-chloro-N-(3-hydroxypropyl) - α - methyl - phenethylamine or p-chloro-N-(2-hydroxypropyl)-α - methyl-phenethylamine. The hydrogenation can be carried out catalytically, as for example, using a platinum or palladium catalyst, or by means of a complex metal hydride such as an alkali metal borohydride.

An alternate process for the preparation of the novel compounds of Formula I comprises condensing p-chloro-α-methyl-phenethylamine and an aldehyde of the formula

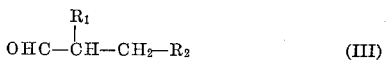

wherein $R_1$ and $R_2$ are as previously mentioned, with simultaneous or subsequent hydrogenation. In the condensation there intermediately results the corresponding Schiff's base, hydrogenation of which yields the desired end product as characterized by Formula I. The reaction can be carried out in an inert solvent; for example, in a lower alkanol, in benzene, toluene or the like. In this embodiment, as in the previous one, the hydrogenation can be carried out catalytically, as for example, using a platinum or palladium catalyst, or by means of a complex metal hydride such as an alkali metal borohydride. The condensation and hydrogenation is conveniently carried out at room temperature or with slight heating, for example, at a temperature in the range of 25–50° C. In the case of subsequent hydrogenation, the preceding condensation can also be effected under reflux conditions.

The compounds of this invention, as represented by Formula I, are bases which can be converted into pharmaceutically acceptable acid addition salts by reaction with acids, in the usual manner, for example, reaction with hydrochloric acid, hydrobromic acid, sulfuric acid, phosphoric acid, tartaric acid, citric acid, malic acid, salicylic acid or the like.

The novel compounds of this invention and their corresponding pharmaceutically acceptable addition salts are useful as appetite-inhibiting substances. Thus, the p-chloro-N-(3-chloropropyl)-α - methyl - phenethylamine and p-chloro-N-(2 - chloropropyl) - α - methyl - phenethylamine and their pharmaceutically acceptable acid addition salts may be utilized in the form of pharmaceutical preparations for appetite-inhibition and for the treatment of obesity.

Generally, phenalkylamine type appetite inhibitors have been known to elevate blood pressure and increase the pulse rate while suppressing the appetite. Such side effects have precluded their use in hypertensive hosts or those afflicted with cardiovascular disease. Unexpectedly, it has been found that the novel compounds characterized by Formula I exert beneficial appetite inhibition without causing appreciable blood pressure changes or appreciable changes in the pulse rate. Additionally, the compounds of this invention exhibit no appreciable motor stimulation.

For such use, the presently disclosed compounds are formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, or the like. Moreover, preservatives, stabilizers, wetting agents, buffers, and the like can be incorporated, if desired, into such formulations. Additionally, the formulations may also contain other therapeutically valuable substances.

The quantity of active medicament which is present in any of the above-described dosage forms is variable. It is preferred, however, for oral administration, to provide capsules or tablets containing from about 5 mg. to about 20 mg. of the Formula I base or an equivalent amount of a pharmaceutically acceptable acid addition salt thereof. For parenteral administration, it is preferred to provide a solution containing from about 1 mg./ml. to about 10 mg./ml. of the Formula I base, or an equivalent quantity of a pharmaceutically acceptable acid addition salt thereof.

The frequency with which any such dosage form will be administered will vary, depending upon the quantity of active medicament present therein and the needs and requirements of the individual being treated. Under ordinary circumstances, however, per individual to be treated up to about 80 mg. of the compound can be administered daily in several dosages. It is to be understood, however, that the dosages set forth herein are exemplary only and that they do not, to any extent, limit the scope or practice of this invention. Moreover, the desired dosage can be administered as a unit or in divided dosages.

Temperatures, unless otherwise stated, are expressed in degrees centigrade.

EXAMPLE 1

52.6 g. of p-chloro-N-(3-hydroxypropyl)-α-methyl-phenethylamine was dissolved in 300 ml. of anhydrous ether. The solution obtained was treated dropwise at room temperature, with stirring, with a total of 50.7 ml. of thionyl chloride. In this way, a solution was obtained from which, on further stirring overnight, the hydrochloride of p - chloro - N - (3 - chloropropyl) - α - methyl - phenethylamine precipitated. After the precipitate was filtered by suction, washed with ether and recrystallized from a mixture of ethanol and ether, 38.5 g. of the p-chloro-N-(3-chloropropyl)-α-methyl-phenethylamine hydrochloride were obtained as white crystals having a melting point of 156° C.

The p - chloro - N - (3 - hydroxypropyl) - α - methyl-phenethylamine used herein as starting material was manufactured as follows:

A solution of 60 g. of p-chlorophenylacetone, 27 g. of 1-amino-propan-3-ol in 300 ml. of toluene was heated at reflux for 4 hours in a vessel fitted with a water-separator. Thereupon, the solvent was removed by distillation. The remaining residue was dissolved in 300 ml. of ethanol and the solution treated portionwise with stirring with a total of 15 g. of sodium borohydride. The reaction mixture was subsequently heated at 40° C. for 2 hours and the solvent was removed by distillation. The remaining residue was treated with 50 ml. of water and shaken out with methylene chloride. The p-chloro-N-(3-hydroxypropyl)-α-methyl-phenethylamine obtained boiled at 125–130° C./0.1 mm. Hg.

In an analogous manner, p-chloro-N-(2-chloropropyl)-α-methyl-phenethylamine, a colorless oil, is prepared utilizing p-chloro-N-(2 - hydroxypropyl)-α-methyl-phenethylamine prepared by the reaction of p-chlorophenylacetone and 1-amino-propan-2-ol.

EXAMPLE 2

A solution of 17 g. of p-chloro-α-methyl-phenethylamine and 10 g. of β-chloropropionaldehyde in 250 ml. of toluene was maintained at 50° C. and 50 atm. for 6 hours. After cooling, the solvent was removed by distillation, and the oily residue was dissolved in 250 ml. of ethanol and treated portionwise with a total of 4 g. of sodium borohydride. Subsequently, the reaction mixture was heated to, and maintained at, 40° C. for 2 hours, and the solvent was removed by distillation. The residue was treated with 50 ml. of water and shaken out with methylene chloride. In this way, 24.2 g. of a colorless oil was obtained which was dissolved in ethanol and treated with an excess of ethanolic hydrochloric acid. After crystallization, 25.1 g. of p-chloro-N-(3-chloropropyl)-α-methyl-phenethylamine hydrochloride were obtained as white crystals having a melting point of 156° C.

EXAMPLE 3

25 g. of p-chloro-α-methyl-phenethylamine were dissolved in 250 ml. of absolute benzene. The resulting solution was stirred and treated dropwise with 14 g. of α-chloropropionaldehyde, whereupon the solution warmed slightly and became turbid. Ten minutes after the addition was completed, the solvent was removed by distillation under reduced pressure at 30° C. and the resulting oily residue was dissolved in 400 ml. of absolute ethanol. Thereafter, the solution was cooled in an icebath to 15–20° C. and then 5 g. of sodium borohydride added thereto. The reaction mixture was then stirred at room temperature for 2 hours. After evaporation of the solvent, the remaining residue was taken up in 200 ml. of water and extracted two times, each time with 250 ml. of ether. The combined ether extracts were washed with water until neutral, dried over magnesium sulfate and concentrated under reduced pressure. The residual, oily p-chloro-N-(2-chloropropyl)-α-methyl-phenethylamine was treated with an excess of a solution of hydrochloric acid in ether. After the addition of ether, p-chloro-N-(2-chloropropyl)-α-methyl-phenethylamine hydrochloride precipitated out. After recrystallization from a mixture of alcohol and ether, it had a melting point of 105–107°.

EXAMPLE 4

Tablets of the following composition were manufactured in the usual manner:

| | Mg. |
|---|---|
| p-Chloro-N-(3-chloropropyl)-α-methyl-phenethylamine hydrochloride | 25 |
| Lactose | 62 |
| Maize starch | 25 |
| Prehydrolyzed maize starch | 10 |
| Calcium stearate | 1 |
| Talc | 2 |
| | 125 |

EXAMPLE 5

Hard gelatin capsules having the following content were manufactured in the usual manner:

| | Mg. |
|---|---|
| p - Chloro - N-(3-chloropropyl)-α-methyl-phenethyl amine hydrochloride | 50 |
| Lactose | 230 |
| Maize starch | 60 |
| Talc | 10 |

EXAMPLE 6

An injection solution manufactured in the usual manner exhibits the following composition:

| | Mg. |
|---|---|
| p - Chloro - N-(3-chloropropyl)-α-methyl-phenethylamine hydrochloride | 10 |
| Benzyl alcohol | 10 |
| Water added, 1 ml. | |

I claim:
1. A compound selected from the group consisting of

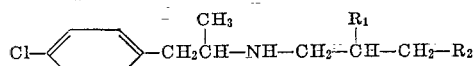

wherein when $R_1$ is hydrogen, $R_2$ is chlorine, and when
$R_1$ is chlorine, $R_2$ is hydrogen,
and pharmaceutically acceptable acid addition salts thereof.

2. A compound in accordance with claim 1 selected from the group consisting of p-chloro-N-(3-chloropropyl)-α-methyl-phenethylamine and pharmaceutically acceptable acid addition salts thereof.

3. A compound in accordance with claim 2, p-chloro-N - (3 - chloropropyl) - α-methyl-phenethylamine hydrochloride.

4. A compound in accordance with claim 1 selected from the group consisting of p-chloro-N-(2-chloropropyl)-α-methyl-phenethylamine and pharmaceutically acceptable acid addition salts thereof.

5. A compound in accordance with claim 4, p-chloro-N - (2 - chloropropyl) - α-methyl-phenethylamine hydrochloride.

References Cited

UNITED STATES PATENTS

| | | | |
|---|---|---|---|
| 3,215,598 | 11/1965 | Hanson | 260—570.8 X |
| 3,320,319 | 5/1967 | Schuler et al. | 260—570.8 |

FOREIGN PATENTS

| | | |
|---|---|---|
| 917,099 | 1/1963 | Great Britain. |
| 96,461 | 7/1963 | Denmark. |

ROBERT V. HINES, Primary Examiner

U.S. Cl. X.R.

260—501.1, 566, 592, 599; 424—330